United States Patent [19]

Johnson et al.

[11] Patent Number: 5,296,515
[45] Date of Patent: Mar. 22, 1994

[54] HYDROVISBREAKING OF HYDROCARBON POLYMERS

[75] Inventors: Marvin M. Johnson; Fernando C. Vidaurri, Jr.; William R. Coutant; Kenneth S. Wheelock, all of Bartlesville, Okla.

[73] Assignee: Phillips Petroleum Company, Bartlesville, Okla.

[21] Appl. No.: 893,165

[22] Filed: Jun. 3, 1992

[51] Int. Cl.$^5$ ............................................. C08F 8/50
[52] U.S. Cl. ................................. 521/47; 525/333.7; 525/338; 525/339
[58] Field of Search ................... 525/338, 339; 521/47

[56] References Cited

U.S. PATENT DOCUMENTS

| | | | |
|---|---|---|---|
| 3,144,436 | 8/1964 | Greene et al. | 260/93.7 |
| 3,248,469 | 4/1966 | Kosinsky et al. | 264/349 |
| 3,287,342 | 11/1966 | Walton | 260/93.7 |
| 3,316,231 | 4/1967 | Canterino et al. | 260/93.7 |
| 3,499,952 | 3/1970 | Kolner et al. | 264/40 |
| 3,704,108 | 11/1972 | Alpert | 44/62 |
| 3,736,271 | 5/1973 | Schutze et al. | 260/2.3 |
| 3,832,151 | 8/1974 | Kitaoka et al. | 48/111 |
| 3,956,414 | 5/1976 | Oshima | 260/683 R |
| 3,957,898 | 5/1976 | Girotti et al. | 260/676 R |
| 3,985,820 | 10/1976 | Albright et al. | 260/683 R |
| 3,998,595 | 12/1976 | Oshima | 23/262 |
| 4,108,730 | 8/1978 | Chen et al. | 201/2.5 |
| 4,118,281 | 10/1978 | Yan | 201/2.5 |
| 4,143,086 | 3/1979 | Carle et al. | 260/683 PD |
| 4,151,216 | 4/1979 | Smith | 260/683 PD |
| 4,195,211 | 11/1979 | Chen et al. | 585/241 |
| 4,446,308 | 5/1984 | Drake | 528/481 |
| 4,642,401 | 2/1987 | Coenen et al. | 585/241 |
| 4,724,068 | 2/1988 | Stapp | 208/213 |
| 4,794,095 | 12/1988 | Walker et al. | 502/64 |
| 4,851,601 | 7/1989 | Fukuda et al. | 585/241 |

OTHER PUBLICATIONS

C. J. Robinson, "Low Resolution Mass Spectrometric Determination of Aromatics and Saturates in Petroleum Fractions", *Analytical Chemistry*, vol. 43, No. 11, (Sep., 1971), pp. 1425-1434.

C. J. Robinson et al, "Low Resolution Mass Spectrometric Determination of Aromatics from Petroleum", *Analytical Chemistry*, vol. 41, No. 12, (Oct., 1969), pp. 1548-1554.

D. L. McKay and B. J. Bertus, "Passivation of Metals on FCC Catalysts with Antimony" *American Chemical Society Petroleum Division Preprints*, vol. 24 (1979) pp. 645-652.

*Primary Examiner*—Bernard Lipman
*Attorney, Agent, or Firm*—W. R. Sharp

[57] ABSTRACT

A method is provided for hydrovisbreaking hydrocarbon polymers, particularly those derived from scrap articles, in which a mixture of at least one hydrocarbon polymer and a solvent is contacted with hydrogen under conditions sufficient to hydrovisbreak the polymer. The solvent comprises a combined weight percentage of $C_nH_{2n-8}$ and $C_nH_{2n-10}$ hydrocarbons of at least about 10 weight percent, where n is an integer of at least 8 in $C_nH_{2n-8}$ and n is an integer of at least 10 in $C_nH_{2n-10}$. The hydrovisbroken polymer can be fed to a catalytic cracker for cracking to cracked products.

8 Claims, 8 Drawing Sheets

HYDROVISBREAKING OF HYDROCARBON POLYMERS

BACKGROUND OF THE INVENTION

This invention relates to a method for hydrovisbreaking of hydrocarbon polymers, such as those polymers derived from scrap plastic articles, which after hydrovisbreaking can be further processed in a catalytic cracker.

The need for recycling of plastics is becoming increasingly apparent as many landfills approach saturation with plastics which are not biodegradable. Although current technology can produce biodegradable plastics, these biodegradable variants frequently possess inferior properties for their intended applications.

One promising type of recycling, known as "tertiary recycling", involves chemical transformation or degradation of the plastic to a new product. Further development in this area would be highly desirable, particularly with regard to development of methods capable of converting plastics, such as hydrocarbon polymers, to new products which can be further processed in a refinery.

SUMMARY OF THE INVENTION

It is, therefore, an object of the invention to provide a method capable of converting scrap plastic composed of hydrocarbon polymers to new and useful products.

It is a further object of the invention to provide such a method which produces products which can be fed to a catalytic cracker of a refinery.

It is yet another object of the invention to provide such a method whose resulting products will not adversely affect the performance of a catalytic cracker.

The above objects are realized by a method comprising: (a) providing a mixture of at least one hydrocarbon polymer and a solvent, wherein the solvent comprises a combined weight percentage of $C_nH_{2n-8}$ and $C_nH_{2n-10}$ hydrocarbons of at least about 10 weight percent, where n is an integer of at least 8 in $C_nH_{2n-8}$ and n is an integer of at least 10 in $C_nH_{2n-10}$; and (b) contacting the mixture, having the hydrocarbon polymer at least partially dissolved in the solvent, with hydrogen under conditions sufficient to hydrovisbreak the hydrocarbon polymer, thereby producing a product containing a fraction which comprises the hydrovisbroken polymer.

According to a preferred embodiment hereinafter described, the hydrocarbon polymer can be derived from approximately shredded and/or ground scrap articles. Furthermore, the fraction of the product which comprises the hydrovisbroken polymer can be introduced to a catalytic cracker as blended with an oil feedstock, and the blended feedstock cracked to cracked products. As demonstrated in a subsequent example, cracking the blended feedstock as compared to the oil feedstock alone can result in an increase in gasoline yield, a decrease in coke yield and a decrease in hydrogen, light gas and ethylene yields.

DETAILED DESCRIPTION OF THE INVENTION

An embodiment of the invention will now be described with reference to the FIGURES. This embodiment is in the context of a commercial refinery. It should be understood, however, that hydrocarbon polymers can be processed in accordance with certain broad aspects of the invention so as to produce products which are not further processed in a refinery. Such products, although less valuable than catalytically cracked products, would have value as fuel oils, etc.

All boiling ranges are hereafter given in terms of an initial boiling point (IBP) and end point (EP).

The term "hydrovisbreak" as applied to a polymer and as used herein and in the appended claims is understood to mean the reduction in molecular weight of the polymer resulting from hydrogenation thereof.

Figure 1:
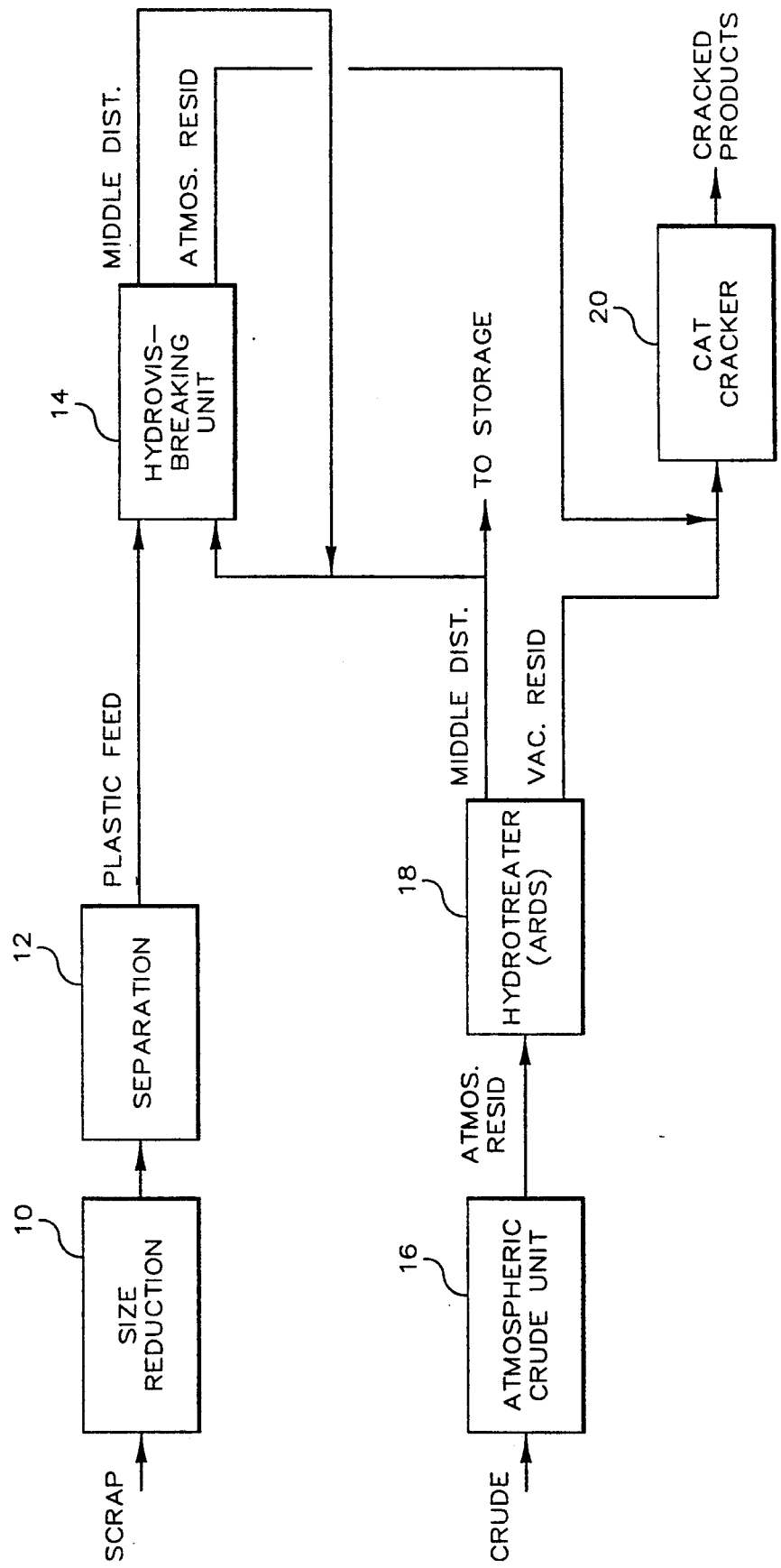
FIG. 1 is a schematic illustration of one embodiment of the invention as incorporated into a refinery.

Referring to FIG. 1, scrap plastic articles are provided as a raw feed. Such plastic articles have preferably been presorted to exclude articles not composed of hydrocarbon polymers. Such hydrocarbon polymers as processed in accordance with the invention generally have a weight average molecular weight in the range of $10,000-1\times10^6$, and can include homopolymers or copolymers of olefins, such as ethylene or propylene, or homopolymers or copolymers of aromatics such as styrene. Preferred polymers are homopolymers and copolymers of ethylene and propylene.

Such scrap plastic articles are preferably reduced in size, as indicated schematically at 10, to smaller pieces by shredding and/or grinding. The sizes of the pieces resulting from such an operation is not particularly critical, as long as they can dissolve in the solvent as is described further below. The size reduced scrap plastic can range from elongated strings to a granular powder.

The scrap plastic as reduced in size at 10 is then preferably subjected to one or more separation steps as schematically indicated at 12 to remove undesirable materials. Such separation steps could include selective floatation or dissolution to remove undesired plastics such as polyvinylchloride, washing to remove labels and various container residues, and removal of any metals by conventional magnetic separation techniques.

The resulting plastic feed is introduced to a hydrovisbreaking unit as indicated at 14.

As further shown in FIG. 1, crude oil is fed to an atmospheric crude unit 16 in which the crude oil is conventionally subjected to atmospheric fractional distillation. The atmospheric residuum resulting from such distillation is then fed to a hydrotreater 18, such as an atmospheric residuum desulfurization (ARDS) unit, which accordingly hydrotreats the residuum in the presence of a supported metal (Ni, Co, Mo) sulfide catalyst at a temperature of about 600° F.–800° F. The desulfurized product is separated into various fractions, including a vacuum residuum, a middle distillate and other products not shown. Such separation is carried out by first distilling the desulfurized product atmospherically to produce the middle distillate and atmospheric residuum (not shown), and then vacuum distilling such residuum to produce the vacuum residuum. The middle distillate product fraction of the hydrotreater, generally having a boiling range of about 300°

F.-600° F. (IBP-EP), is split into two portions, one of which is passed to the hydrovisbreaking unit 14 so as to serve as the solvent in the hydrovisbreaking of the plastic feed. The other portion goes to storage for use as a fuel oil. Such middle distillate product fraction of a hydrotreater is particularly well suited as the solvent in hydrovisbreaking in view of its possession of characteristics which are desirable in the solvent and which are described further below.

The solvent comprises a combined weight percentage of $C_nH_{2n-8}$ and $C_nH_{2n-10}$ hydrocarbons of at least about 10 weight percent and most preferably at least about 20 weight percent, where n is an integer of at least 8 in $C_nH_{2n-8}$ and n is an integer of at least 10 in $C_nH_{2n-10}$. Where the solvent is the middle distillate product fraction of a hydrotreater as discussed above, the combined weight percentage of such hydrocarbons is typically in the range of about 20-30 weight percent.

Hydrocarbons of the formula $C_nH_{2n-8}$ include structures characterized by an aromatic ring fused to a naphthene (cycloparaffin) such that the aromatic ring shares two carbons with the naphthene. Such hydrocarbons are called benzocycloparaffins or naphthenebenzenes. Examples are 1,2,3,4-tetrahydronaphthalene (tetralin) and alkyl substituted variations thereof. Hydrocarbons of the formula $C_nH_{2n-10}$ include structures characterized by an aromatic ring fused to two naphthenes such that each naphthene shares two carbons with the aromatic ring. Such hydrocarbons are called benzodicycloparaffins or dinaphthenebenzenes. Examples include 1,2,3,4,5,6,7,8-octahydroanthracene (othracene) and alkyl substituted variations thereof.

The plastic feed is hydrovisbroken in the solvent in hydrovisbreaking unit 14, as will be described in detail with reference to FIG. 2. The resulting product is separated into various fractions, one fraction being a middle distillate which, as shown in FIG. 1, is recycled as solvent through the hydrovisbreaking unit 14. Another fraction is an atmospheric residuum which is blended with the vacuum residuum product fraction of hydrotreater 18 and fed to the catalytic cracker 20. The atmospheric residuum product fraction of the hydrovisbreaking unit comprises the hydrovisbroken plastic feed. The blended feedstock as introduced to catalytic cracker 20 preferably comprises about 5-25 wt. % of the atmospheric residuum product fraction of the hydrovisbreaking unit and about 75-95 wt. % of the vacuum residuum product fraction of the hydrotreater.

Although the oil as blended with the residuum product fraction of the hydrovisbreaking unit is a vacuum residuum product fraction of a hydrotreater, it should be understood that such an oil can be any oil suitable for catalytic cracking as contained in the blended feedstock. Generally, such an oil has an initial boiling point (IBP) in excess of 500° F., and preferably has a boiling range of from about 600° F. to 1100° F. (IBP-EP). The oil is further generally characterized by an API gravity at 60° F. of about 5-40 and most preferably about 10-35, a Conradson carbon content of about 5 wt. %, a sulfur content of about 0.1-5 wt. %, and detectable but trace (generally less than 50 ppm) quantities of various metals such as nickel, vanadium and iron.

Catalytic cracking in cracker 20 can employ any suitable reactor, such as a fluidized-bed catalytic cracking (FCC) reactor or moving bed catalytic cracking reactor, although the FCC reactor is preferred. Cracking can be carried out in the presence of any suitable cracking catalyst. A preferred cracking catalyst is a zeolite-containing catalyst in which the zeolite component is dispersed in a suitable solid refractory inorganic matrix material, such as silica-alumina. Specific operating conditions depend greatly on the composition and properties of the blended feedstock as received by the cracker, the dimensions of the reactor and the feed rate. In an FCC operation, the weight ratio of catalyst to feedstock is generally about 2:1-10:1, the contact time between the feedstock and catalyst is generally about 0.2-2.0 seconds, and the cracking temperature is generally about 800°-1200° F. Steam is added with the feedstock so as to aid in dispersion. The cracking catalyst is regenerated and recycled to the reactor. Finally, the separation of spent cracking catalyst from gaseous and liquid cracked products and the separation of cracked products into various fractions can be carried out by any conventional means. Desirable and valuable cracked products include gasoline, light cycle oil and heavy cycle oil.

Figure 2:
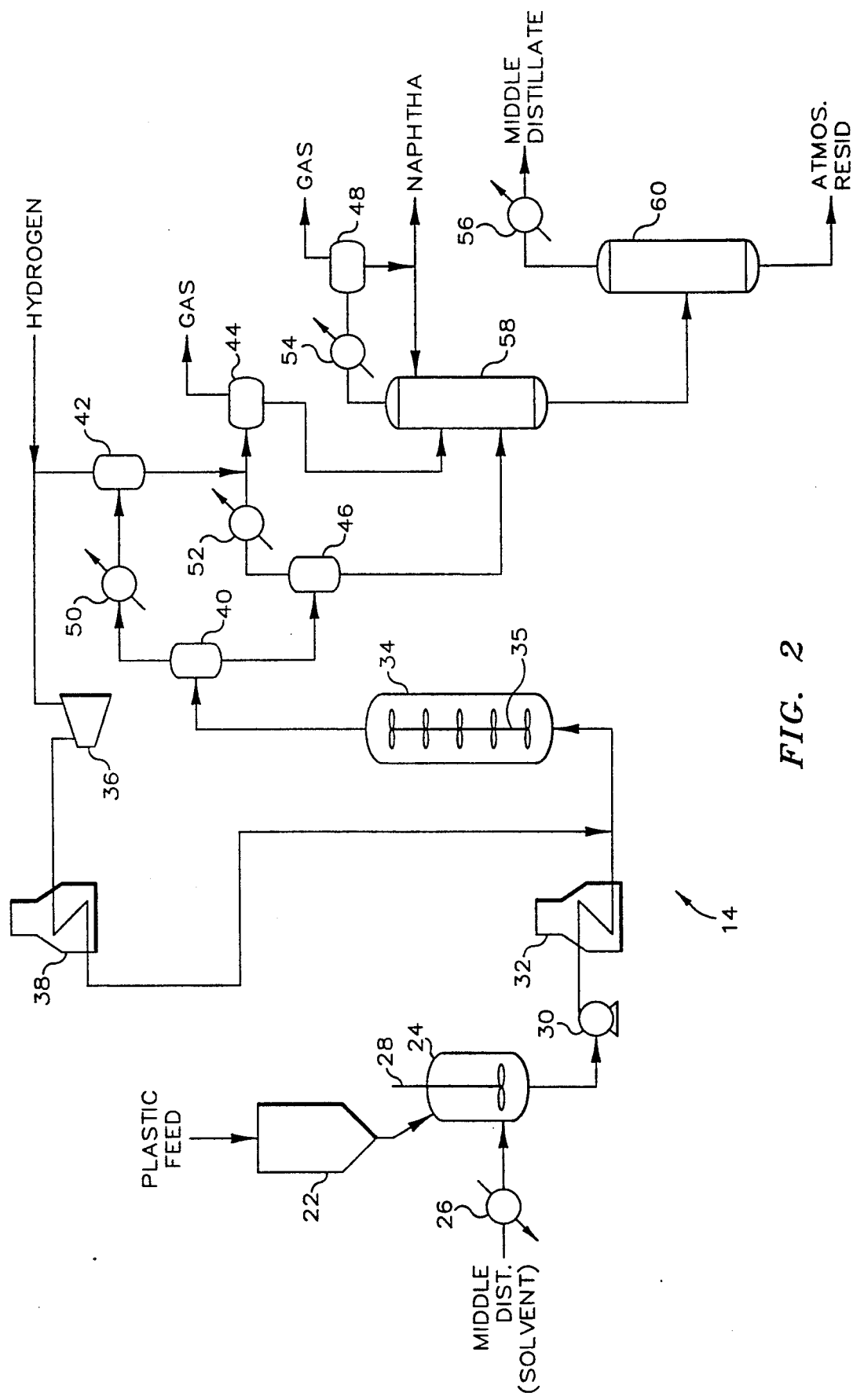
FIG. 2 is a schematic illustration of an embodiment of the hydrovisbreaking unit shown in FIG. 1.
Figure 3:
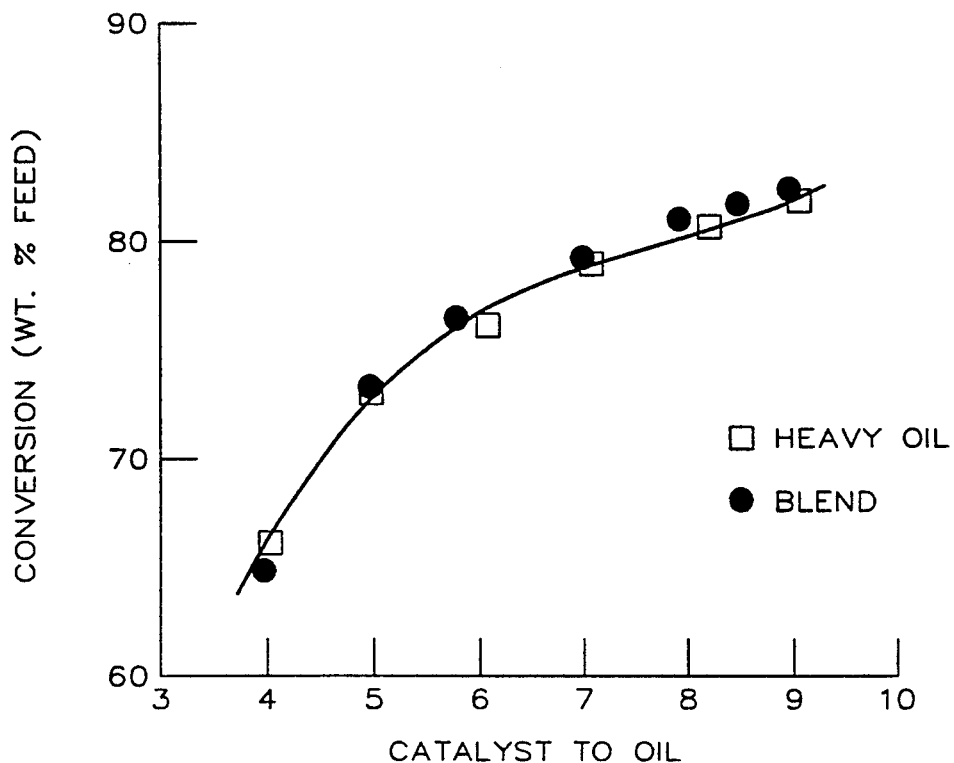
FIGS. 3-13 are graphs which illustrate the relationship of various data parameters from Example II, wherein a heavy oil feedstock as a control and a blended feedstock in accordance with the invention are catalytically cracked to produce cracked products.
Figure 4:
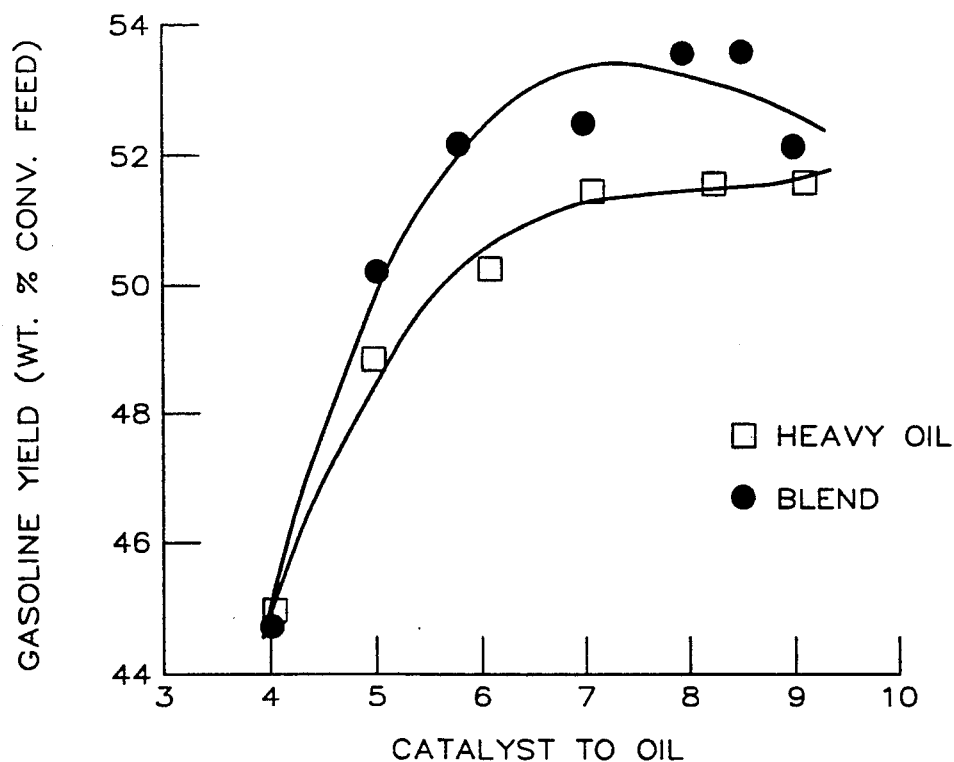

Referring now to FIG. 2, there is shown a more detailed illustration of hydrovisbreaking unit 14. As shown, the plastic feed is supplied to hopper 22 which gravity feeds the plastic feed to mixer 24 at a constant predetermined rate. The middle distillate, hereafter referred to as solvent, is likewise supplied to mixer 24 after having been preheated by preheater 26 to a temperature of preferably about 300° F.-500° F. The weight ratio of solvent to plastic feed is preferably about 1-4 to 1, most preferably about 2-3 to 1. Mixer 24 is shown as being equipped with an agitator 28 for thoroughly mixing the plastic feed and solvent, preferably in a manner which results in dissolving of the plastic feed in the solvent. However, the plastic feed could simply be slurried in the solvent if desired, providing appropriate equipment as provided to transport the slurry from the mixer. In such case the plastic feed would dissolve in the solvent in the hydrovisbreaking reactor later described. Whether a slurry or a homogeneous solution, the mixture is passed by pump 30 through heater 32 and to hydrovisbreaking reactor 34.

Hydrogen (in preferably pure form or as contained as the primary component in a gaseous mixture) is supplied to hydrovisbreaking unit 14, most conveniently from another part of the refinery such as from a catalytic or natural gas reformer. As shown, the hydrogen is passed through compressor 36 and heater 38, and is then supplied with the mixture to hydrovisbreaking reactor 34.

The mixture and hydrogen enter hydrovisbreaking reactor 34 at a space velocity of preferably about 0.25-2 feed mixture vol./reactor vol./hr. and at the desired reaction temperature. Such temperature, as achieved by heater 32 and 38, is preferably at least about 700° F., more preferably in the range of about 750° F.-1200° F., most preferably in the range of about 800° F.-1000° F. The pressure in the reactor is preferably maintained at about 500-3000 psig, more preferably about 700-2000 psig, and most preferably about 900-1500 psig. The contents of hydrovisbreaking reactor 34 are continuously agitated by an agitator, schematically indicated at 35. Product, in a mixed phase of liquid having various gases dispersed therein, is allowed to overflow from the reactor as overhead product and into separator 40.

Hydrovisbreaking in hydrovisbreaking reactor 34 is preferably carried out as described above in the absence of any catalyst, although a suitable catalyst such as nickel or cobalt molybdenum sulfides on alumina or silica-alumina could be employed if desired.

The product from hydrovisbreaking reactor 34 is separated into various fractions in a manner which should be apparent to one skilled in the art with reference to FIG. 2. Separation of the product into recyclable hydrogen, two gaseous fractions comprising light $C_1$-$C_4$ gases, naphtha, middle distillate and atmospheric residuum is accomplished by: separators 40, 42, 44, 46 and 48; condensors 50, 52, 54 and 56; and atmospheric distillation columns 58 and 60. As discussed with reference to FIG. 1, the middle distillate is recycled as solvent in hydrovisbreaking and the atmospheric residuum is blended as a component of the blended feedstock to catalytic cracker 20.

Obviously many modifications and variations of the invention are possible in light of the above teachings. For example, instead of using the middle distillate product fraction of the hydrotreater as the solvent, the vacuum residuum fraction could be employed. In such an embodiment, at least some of the separation steps would be eliminated from FIG. 2 since the solvent as blended with hydrovisbroken polymer would be introduced directly to the catalytic cracker rather than being removed and recycled.

Examples will now be described to further illustrate the invention, but which should not be construed to limit the invention in any manner.

EXAMPLE I

The purpose of this example is to demonstrate the hydrovisbreaking of polyethylene and polypropylene in a solvent in accordance with the invention.

Four runs were carried out employing different polymer samples in a solvent which was taken from a refinery product stream. The polymer sample in each run was a homopolymer in the form of a "fluff" (powder) which had not been pretreated or pelletized. The solvent employed in each run was taken from a distillate product fraction stream of an atmospheric residuum desulfurization (ARDS) unit. A sample of this product stream having a boiling range of about 300° F.–570° F. (IBP-EP), an API gravity at 60° F. of 32.3 and a numerical average molecular weight of 192 was subjected to mass spectral analysis with a CEC 21-103 mass spectrometer substantially in accordance with the procedure described in an article entitled "Low-Resolution Mass Spectrometric Determination of Aromatics and Saturates in Petroleum Fractions", by C. J. Robinson, *Analytical Chemistry*, vol. 43, no. 11, September 1971. Masses 24–300 were scanned with the mass spectrometer.

The results of this analysis are set forth in Table IA. Only those compound types actually detected are indicated in Table IA.

TABLE IA

| Compound Type | Vol. % | Wt. % |
| --- | --- | --- |
| Paraffin | 23.4 | 20.6 |
| Noncondensed cycloparaffins | 18.1 | 17.0 |
| Condensed cycloparaffins 2-ring | 8.8 | 8.9 |
| Condensed cycloparaffins 3-ring+ | 2.7 | 2.8 |
| Benzenes | 15.5 | 15.5 |
| Naphthenebenzenes | 18.5 | 20.1 |
| Dinaphthenebenzenes | 6.3 | 6.8 |
| Naphthalenes | 2.1 | 2.4 |
| Acenaphthenes + Dibenzofurans | 3.3 | 4.1 |

TABLE IA-continued

| Compound Type | Vol. % | Wt. % |
| --- | --- | --- |
| Fluorenes | 0.8 | 1.0 |
| Phenanthrenes | 0.3 | 0.4 |
| Benzothiophenes | 0.2 | 0.3 |

It can be seen from Table IA that the total saturate content (first four types of compounds) is 53.0 vol. % or 49.3 wt. % and the total aromatic content (remaining types which each include at least one aromatic ring) is 47.0 vol. % or 50.7 wt. %. More importantly with respect to this invention, the combined vol. % and wt. % of "naphthenebenzenes" and "dinaphthenebenzenes" are 24.8 vol. % and 26.9 wt. %, respectively. For the purposes of this analytical procedure, the compound type "naphthenebenzenes" is defined as hydrocarbons of the formula $C_nH_{2n-8}$, where n is at least 8, and the compound type "dinaphthenebenzenes" is defined as hydrocarbons of the formula $C_nH_{2n-10}$, where n is at least 10.

It should be noted that the analytical procedure employed to obtain the results of Table IA does not consider the possible presence of olefins and certain sulfur-containing compounds other than thiophenes in the analyzed sample. Therefore, the indicated wt. % and vol. % values are actually wt. % and vol. % of all compound types actually considered. However, in view of the fact that the sample is known to contain less than 3 wt. % olefins and less than 0.05 wt. % sulfur from other analyses, the indicated wt. % and vol. % values closely approximate the wt. % and vol. % of the total weight and volume, respectively, of the sample.

The same general procedure was utilized in each of the four runs of this example. A sample polymer was charged to an Autoclave Engineers 300 mL autoclave reactor, operated with agitation at 600 rpm, along with 100 mL of the above-described solvent. The reactor was purged twice with hydrogen to remove other gases from the reactor, followed by pressuring the reactor to 400 psig. The reactor was then sealed and heated over a "ramp time" indicated in Table I to a temperature and corresponding pressure in the ranges also indicated in Table I. These temperature and pressure conditions were maintained for a "reaction time" indicated in Table I, after which the reactor heater was turned off to allow the reactor to cool. The reactor was accordingly allowed to cool to room temperature and vented to return the reactor to atmospheric pressure. The reactor was then heated to a temperature of about 150° F.–200° F. to enhance the flowability of the reactor product which was drained from the reactor and analyzed as discussed below.

Data for each run is set forth in Table IB. Molecular weights were determined by gel permeation chromatographic analysis from which resulting data was incorporated into weight average molecular weight and numerical average molecular weight definitional equations as provided in ASTM 1990, v. 8.03, p. 127. Molecular weights given in Table IB are understood to indicate the molecular weights of the hydrovisbroken polymers in the reactor product since the effect of the solvent (having a numerical average molecular weight of only 192) on the determination of such molecular weights was negligible.

TABLE IB

|  | Run 1 | Run 2[a] | Run 3 | Run 4 |
|---|---|---|---|---|
| Polymer | Polypropylene | Polyethylene | Polyethylene | Polyethylene |
| Amt. of Polymer (g) | 42 | 28 | 28 | 28 |
| Temperature (°F.) | 729–730 | 711–733, 751–755 | 815–825 | 809–835 |
| Pressure (psig) | 790–820 | 670–680, 830–855 | 980–1025 | 1000–1220 |
| Ramp time (mins.) | 75 | 75, NR[b] | 65 | 50 |
| Reaction time (mins.) | 35 | 75, 30 | 103 | 25 |
| Polymer WAMW[c] | 440,000 | 138,000 | 138,000 | 34,100 |
| Product WAMW[c] | 11,400 | 9,900 | <2,000 | 2,100 |
| Polymer NAMW[d] | 49,600 | 13,500 | 13,500 | 7,100 |
| Product NAMW[d] | 6,700 | 5,100 | ND[f] | 1,600 |
| Polymer HI[e] | 8.9 | 10.2 | 10.2 | 4.8 |
| Product HI[e] | 1.7 | 1.9 | ND[f] | 1.3 |

[a] Run 2 was done in two parts as indicated by two sets of data. The first part resulted in a solid material in the reactor. After cooling and venting, the reactor was repressured and reheated in the second part to the higher temperature and associated pressure as indicated, resulting in the product which was analyzed.
[b] NR means not recorded.
[c] WAMW is weight average molecular weight.
[d] NAMW is numerical average molecular weight.
[e] HI is heterogeneity index, or WAMW/NAMW.
[f] ND means not determined.

It can be seen from Table IB that the weight average and numerical average molecular weights of the product in each of runs 1–4 are significantly less than the corresponding molecular weights of the polymer feed. A comparison of the heterogenity indexes (HI) in Table IB also indicates the index for the product in each run to be significantly less than the index for the polymer feed.

The product from run 4 was further processed by distillation to a 600° F. endpoint to yield a fraction, hereafter referred to as "600° F.+ product fraction", having an initial boiling point above 600° F. 30.3 g of the 600° F.+ product fraction was recovered, slightly exceeding the amount (28.0 g) of polyethylene feed used in Example I, but closely approximating the hydrovisbroken polyethylene fraction of the product.

EXAMPLE II

The purpose of this example is to demonstrate catalytic cracking of a blend of heavy oil cracker feedstock and the 600° F.+ product fraction from Example I, and to compare results from such cracking to results of control runs employing only the heavy oil feedstock.

The catalyst used in this example was an equilibrium catalyst, which had been supplied as fresh catalyst by Davison Chemical Division of W. R. Grace and Company, Baltimore, Md., and had previously been employed in a commercial FCC (Fluid Catalytic Cracker) cracking process and thereafter regenerated by heating in air. The fresh catalyst contained about 25 wt. % zeolite and about 75 wt. % silica-alumina matrix. The equilibrium catalyst was characterized by a surface area of 110.00 m²/g, a pore volume of 0.18 cc/g, an avg. pore radius of 33.20 angstroms, a mesopore area of 46.00 m²/g, a micropore area of 64.00 m²/g, a micropore volume of 0.0260 cc/g, an apparent bulk density of 0.90 g/cc, a unit cell size of 24.36 angstroms, a carbon content of 0.090 wt. %, a sulfur content of 0.0 wt. %, a nickel content of 0.165 wt. %, a vanadium content of 0.358 wt. %, an iron content of 0.0 wt. %, a copper content of 0.0 wt. % and an antimony content of 0.0620 wt. %.

The heavy oil feedstock used in this example was a hydrotreated residuum taken from the input stream to a commercial heavy oil cracker (HOC). The heavy oil feedstock was characterized by an API gravity at 60° F. of 18.7, a density of 0.9421 g/cc, a Conradson carbon content of 6.670 wt. %, a saturate content of 48.7 wt. %, a resin content of 12.8 wt. %, an asphaltene content of 9.3 wt. %, an n-C$_5$ unsoluble content of 2.14 wt. %, a sulfur content of 0.530 wt. %, a nickel content of 10.60 ppm, a vanadium content of 12.70 ppm, an iron content of 9.57 ppm, a sodium content of 4.67 ppm and a basic nitrogen content of 892 ppm.

The 600° F.+ product fraction from Example I was mixed with the above-described heavy oil feedstock to produce a blended feedstock containing 10 wt. % 600° F.+ product fraction and 90 wt. % heavy oil feedstock. A comparison of the CHNS analysis for the heavy oil feedstock to that of the blended feedstock is provided in Table IIA.

TABLE IIA

| Elemental Component | Heavy Oil Feedstock (wt. %) | Blended Feedstock (wt. %) |
|---|---|---|
| carbon | 86.7 | 87.0 |
| hydrogen | 12.4 | 12.2 |
| nitrogen | 0.46 | 0.24 |
| sulfur | 0.46 | 0.34 |

Table IIA indicates that blending the 600° F.+ product fraction with the heavy oil feedstock causes a decrease in the nitrogen and sulfur content.

The heavy oil feedstock was first catalytically cracked in control runs 1–17, followed by catalytic cracking of the blended feedstock in runs 18–32 in accordance with the invention. Each of the runs employed different catalyst to oil (feedstock) weight ratios with 35 grams of catalyst in a micro-confined bed unit (MCBU). The MCBU is described in Example II of U.S. Pat. No. 4,794,095 and in an article entitled "Passivation of Metals on FCC Catalysts with Antimony" by D. L. McKay and B. J. Bertus, *American Chemical Society Petroleum Division Preprints*, vol. 24, p. 645 (1979), each of which references is hereby incorporated by reference.

Feedstock was injected by means of a syringe pump over a period of 30 seconds into a quartz reactor of the MCBU containing the catalyst. An upflow of nitrogen (about 150 cc/min.) served to fluidize the bed of catalyst during injection of the feedstock and also served to strip the catalyst. Such nitrogen flow and collection of cracked products through an outlet tube continued for a period of 300 seconds, during which time the reactor was heated to a temperature of 950° F. The cracked product stream from the reactor was passed through a cold trap (about 0° C.) where condensable products were collected, and the remaining gaseous products were collected in a 4-liter bulb filled with water at room temperature. The gaseous cracked products were analyzed by means of a gas chromatograph. The liquid cracked products were analyzed by simulated distillation using a gas chromatograph. Regeneration to zero coke on catalyst was carried out with an upflow of air through the reactor at 1250° F. The reactor and catalyst therein was weighed before and after regeneration to determine the amount of coke deposited on the catalyst. All runs had material balances of 100%±3%.

Results of the control runs and inventive runs are summarized in Tables IIB and IIC, respectively. Catalyst to oil ratios are shown as single numbers which are understood to represent ratios of such numbers to one.

parison between the control runs and inventive runs. Representative data points from the data of Tables IIB and IIC are plotted in FIGS. 3-13, and curves have been fitted to such data points.

Figure 5:
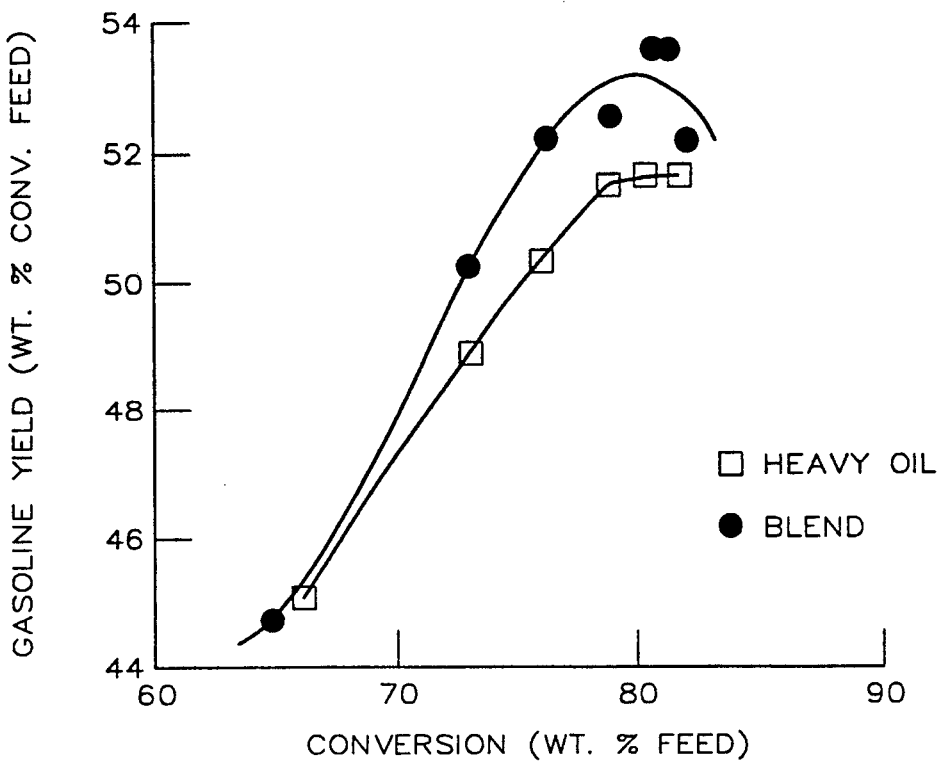
Figure 6:
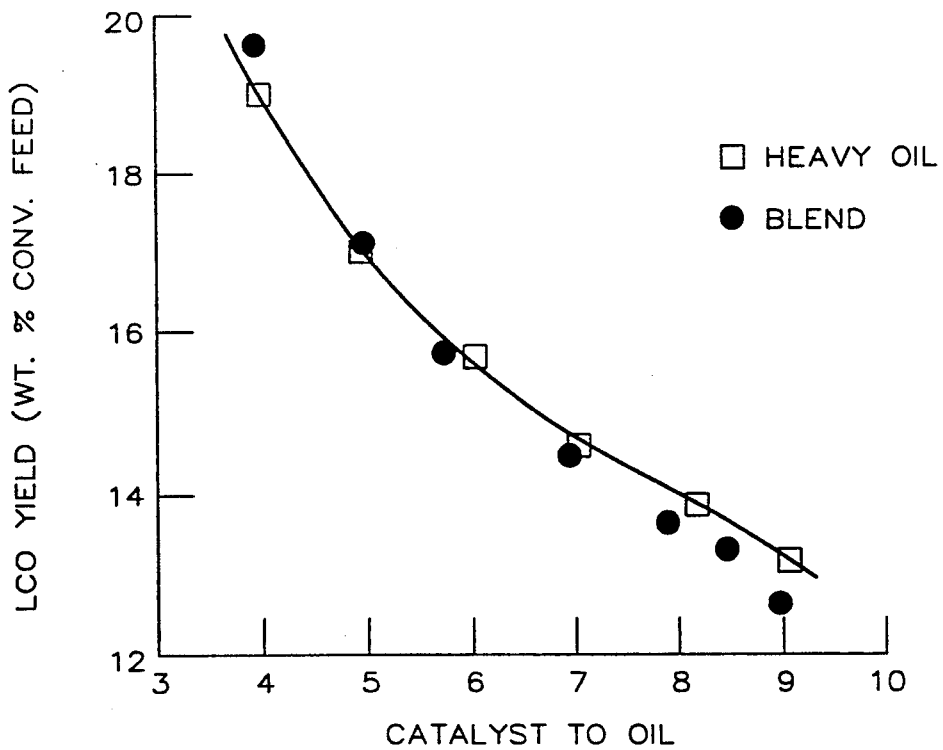
Figure 7:
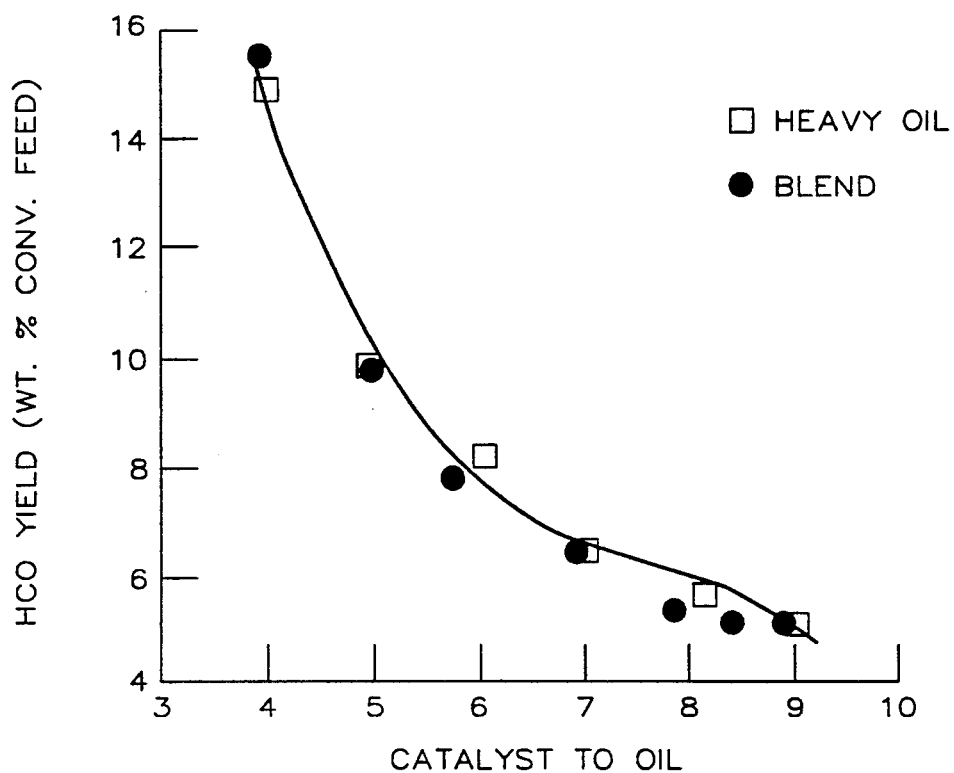
Figure 8:
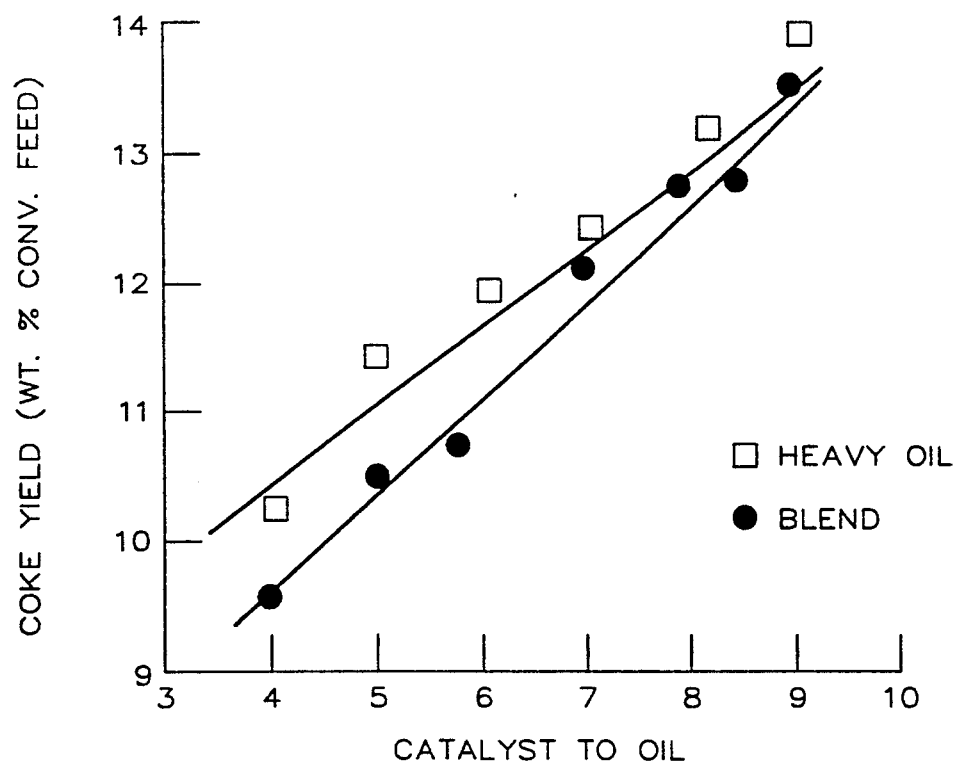
Figure 9:
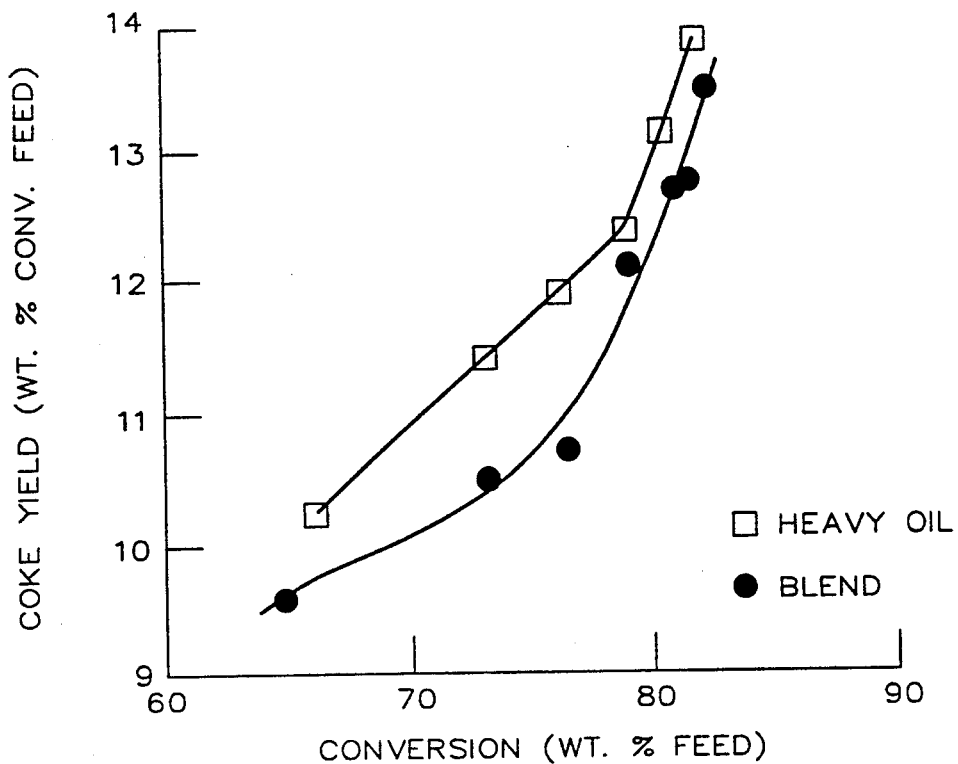
Figure 10:
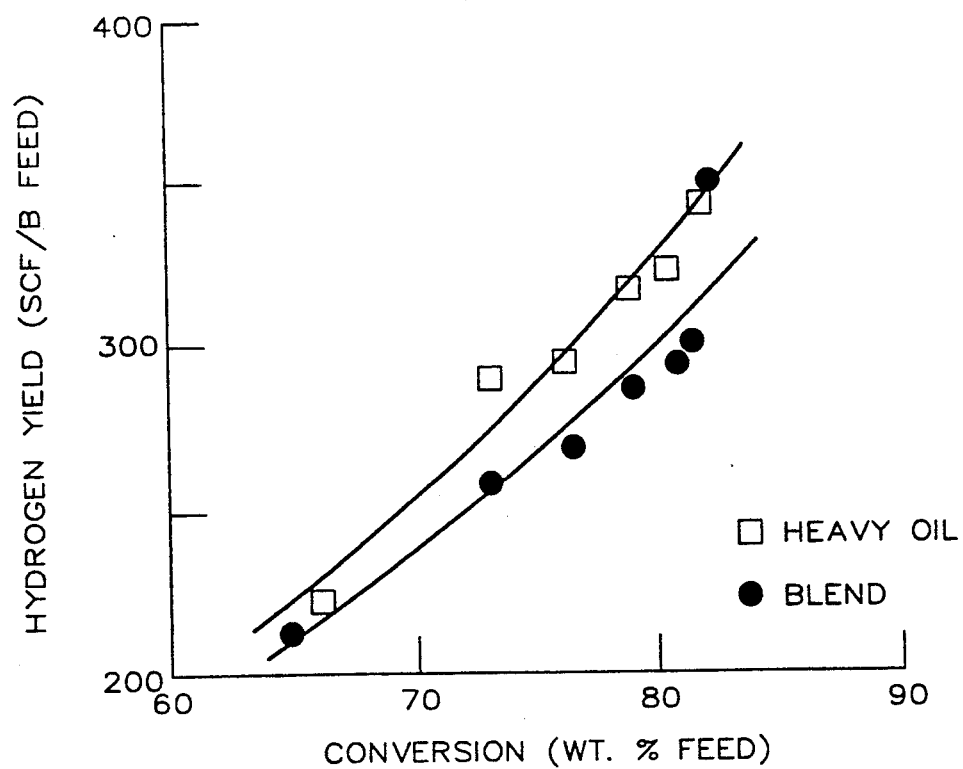
Figure 11:
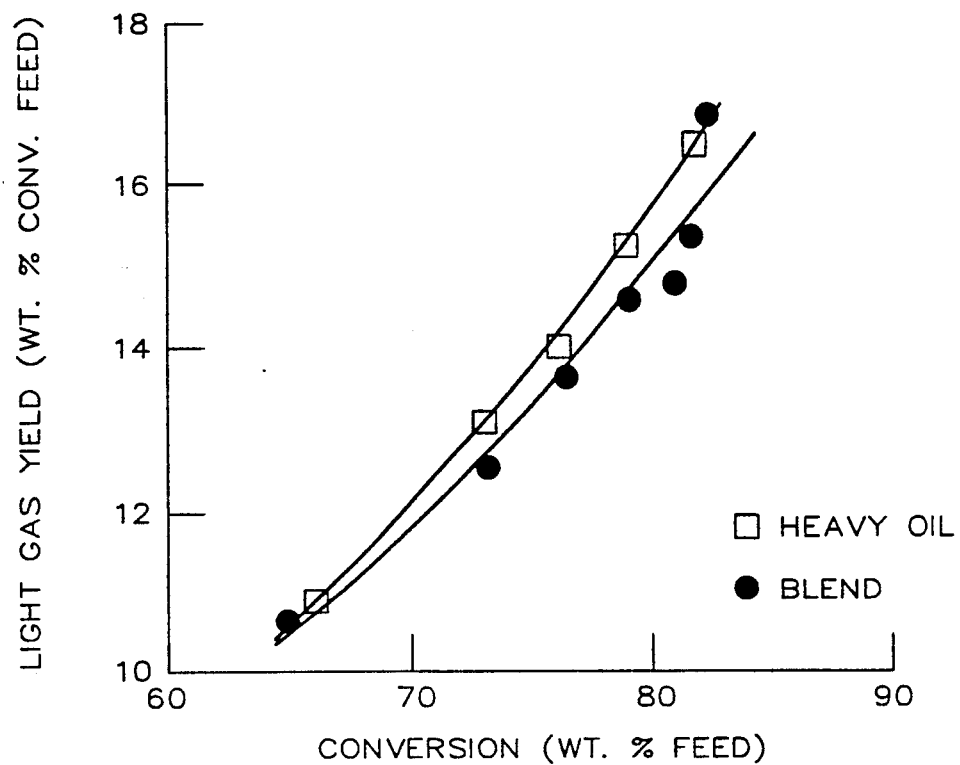
Figure 12:
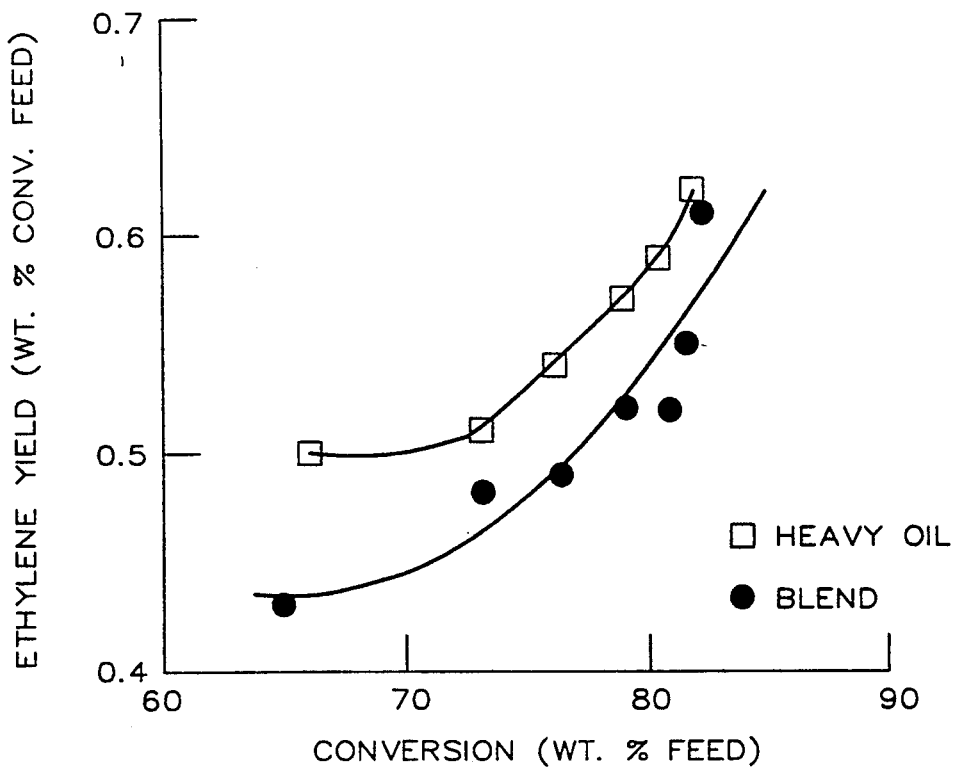
Figure 13:
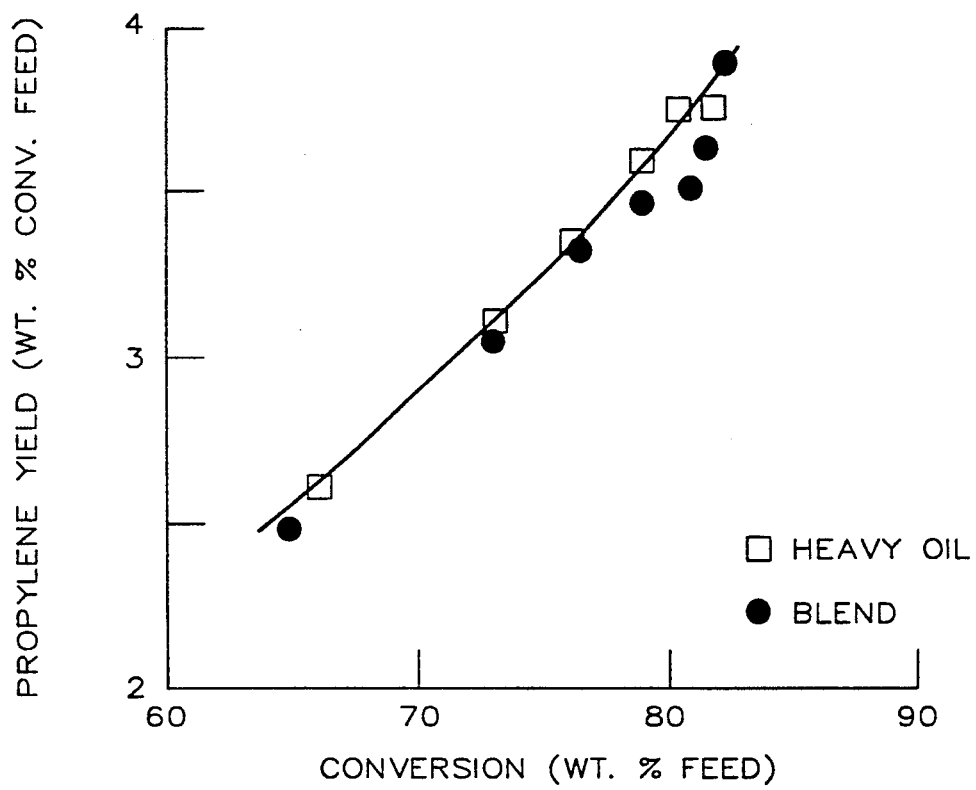

Blending the 600° F.+ product fraction with the heavy oil feedstock does not affect conversion as a function of catalyst to oil ratio (FIG. 3), but actually increases the gasoline yield over a wide range of catalyst to oil ratios (FIG. 4) and conversion percentages (FIG. 5). Both light cycle oil yields (FIG. 6) and heavy cycle oil yields (FIG. 7) as a function of catalyst to oil ratio and as obtained with the blended feedstock do not depart significantly from those yields obtained with the heavy oil feedstock alone. Coke yield on the catalyst is lower with the blended feedstock when considered as a function of catalyst to oil ratio (FIG. 8) and when considered as a function of conversion (FIG. 9). The plotted data also shows hydrogen yields (FIG. 10), light gas yields (FIG. 11) and ethylene yields (FIG. 12) as a function of conversion to be slightly decreased with the

TABLE IIB

Control Runs Using Heavy Oil Feedstock

| Run | Catalyst to Oil | Conversion (wt. % Feed) | Gasoline Yield Wt. % Conv. Feed) | LCO[a] Yield (wt. % Conv. Feed) | HCO[b] Yield (wt. % Conv. Feed) | Coke Yield (wt. % (Conv. Feed) | Light Gas Yield (wt. % Conv. Feed) | Ethylene Yield (wt. % Conv. Feed) | Propylene Yield (wt. % Conv. Feed) | Hydrogen Yield (SCF/B)[d] |
|---|---|---|---|---|---|---|---|---|---|---|
| 1 | 4.05 | 66.17 | 44.99 | 18.94 | 14.89 | 10.23 | 10.91 | 0.50 | 2.61 | 222 |
| 2 | 4.98 | 71.51 | 48.06 | 17.58 | 10.91 | 10.99 | 12.43 | 0.48 | 2.96 | 260 |
| 3 | 4.99 | 75.56 | 49.63 | 16.02 | 8.42 | 11.66 | 14.23 | 0.57 | 3.35 | 335 |
| 4 | 5.06 | 72.51 | 48.69 | 17.28 | 10.21 | 11.16 | 12.63 | 0.49 | 3.01 | 268 |
| 5 | 6.07 | 75.55 | 50.02 | 15.34 | 9.12 | 11.50 | 14.02 | 0.55 | 3.40 | 297 |
| 6 | 6.07 | 75.11 | 48.98 | 15.28 | 9.62 | 11.66 | 14.45 | 0.57 | 3.47 | 312 |
| 7 | 6.07 | 76.79 | 51.17 | 15.58 | 7.63 | 11.88 | 13.74 | 0.51 | 3.20 | 284 |
| 8 | 6.07 | 77.08 | 51.04 | 15.63 | 7.29 | 12.25 | 13.79 | 0.51 | 3.25 | 292 |
| 9 | 6.10 | 76.13 | 50.34 | 15.91 | 7.96 | 12.05 | 13.74 | 0.52 | 3.29 | 287 |
| 10 | 7.05 | 78.77 | 51.15 | 14.70 | 6.53 | 12.01 | 15.61 | 0.59 | 3.68 | 326 |
| 11 | 7.09 | 79.25 | 51.62 | 14.34 | 6.41 | 12.79 | 14.83 | 0.54 | 3.48 | 308 |
| 12 | 8.23 | 80.60 | 51.51 | 13.76 | 5.64 | 13.15 | 15.94 | 0.59 | 3.74 | 323 |
| 13 | 9.21 | 82.41 | 51.23 | 12.80 | 4.79 | 14.07 | 17.11 | 0.64 | 3.91 | 353 |
| 14 | 6.09 | 76.38 | 49.86 | 15.77 | 7.86 | 12.37 | 14.13 | 0.52 | 3.33 | 286 |
| 15 | 6.08 | 75.41 | 49.66 | 16.03 | 8.56 | 11.99 | 13.76 | 0.52 | 3.24 | 293 |
| 16 | 6.19 | 76.99 | 50.64 | 15.56 | 7.45 | 11.66 | 14.67 | 0.59 | 3.50 | 297 |
| 17 | 8.97 | 81.38 | 51.85 | 13.32 | 5.30 | 13.67 | 15.86 | 0.59 | 3.60 | 332 |

[a]LCO is light cycle oil.
[b]HCO is heavy cycle oil.
[c]Light gases include $C_1$-$C_4$ hydrocarbons and hydrogen.
[d]SCF/B is standard cubic feet/barrel of feed.

TABLE IIC

Inventive Runs Using Blended Feedstock

| Run | Catalyst to Oil | Conversion (wt. % Feed) | Gasoline Yield (wt. % Conv. Feed) | LCO[a] Yield (wt. % Conv. Feed) | HCO[b] Yield (wt. % Conv. Feed) | Coke Yield (wt. % (Conv. Feed) | Light Gas Yield (wt. % Conv. Feed) | Ethylene Yield (wt. % Conv. Feed) | Propylene Yield (wt. % Conv. Feed) | Hydrogen Yield (SCF/B)[d] |
|---|---|---|---|---|---|---|---|---|---|---|
| 18 | 7.01 | 79.08 | 52.38 | 14.40 | 6.52 | 12.17 | 14.53 | 0.51 | 3.47 | 282 |
| 19 | 6.97 | 79.51 | 53.07 | 14.39 | 6.10 | 12.39 | 14.05 | 0.50 | 3.34 | 270 |
| 20 | 6.96 | 78.03 | 51.78 | 14.85 | 7.12 | 11.71 | 14.54 | 0.52 | 3.48 | 277 |
| 21 | 7.07 | 79.45 | 51.54 | 14.08 | 6.47 | 12.17 | 15.73 | 0.57 | 3.65 | 308 |
| 22 | 6.97 | 80.04 | 52.34 | 13.79 | 6.17 | 12.28 | 15.42 | 0.55 | 3.67 | 294 |
| 23 | 6.89 | 78.57 | 53.00 | 15.03 | 6.40 | 11.40 | 14.18 | 0.52 | 3.31 | 283 |
| 24 | 6.97 | 79.48 | 52.76 | 14.22 | 6.29 | 12.70 | 14.03 | 0.49 | 3.37 | 292 |
| 25 | 7.93 | 81.03 | 53.54 | 13.57 | 5.39 | 12.71 | 14.78 | 0.52 | 3.51 | 294 |
| 26 | 8.48 | 81.63 | 53.52 | 13.21 | 5.17 | 12.76 | 15.35 | 0.55 | 3.63 | 300 |
| 27 | 8.88 | 82.33 | 52.44 | 12.53 | 5.14 | 13.49 | 16.40 | 0.58 | 3.82 | 350 |
| 28 | 3.99 | 64.92 | 44.68 | 19.56 | 15.52 | 9.59 | 10.62 | 0.43 | 2.48 | 212 |
| 29 | 9.09 | 82.39 | 51.68 | 12.54 | 5.07 | 13.45 | 17.26 | 0.63 | 3.94 | 350 |
| 30 | 7.08 | 78.88 | 52.79 | 14.60 | 6.52 | 11.97 | 14.12 | 0.49 | 3.36 | 280 |
| 31 | 5.02 | 73.19 | 50.14 | 17.00 | 9.81 | 10.48 | 12.55 | 0.48 | 3.05 | 257 |
| 32 | 5.81 | 76.49 | 52.11 | 15.72 | 7.79 | 10.71 | 13.65 | 0.49 | 3.31 | 268 |

[a]-[d]Same as in Table IIB.

FIGS. 3-13 plot various data parameters against other data parameters to more clearly illustrate a comblended feedstock. Finally, propylene yields as a function of conversion (FIG. 13) are about the same for the blended feedstock and heavy oil feedstock.

In the inventive runs 18-32, no catalyst deactivation was observed as a consequence of cracking the blended feedstock. There was no accelerated catalyst attrition and no increased generation of catalyst fines.

That which is claimed is:

1. A method comprising:
   (a) providing a mixture of at least one hydrocarbon polymer and a solvent, wherein the solvent comprises a combined weight percentage of $C_nH_{2n-8}$ and $C_nH_{2n-10}$ hydrocarbons of at least about 10 weight percent, where n is an integer of at least 8 in $C_nH_{2n-8}$ and n is an integer of at least 10 in $C_nH_{2n-10}$;
   (b) contacting the mixture, having said at least one hydrocarbon polymer at least partially dissolved in the solvent, with hydrogen under conditions which include a temperature of about 750° F.-1200° F. and a pressure of about 700-2000 psig, and which are sufficient to hydrovisbreak said at least one hydrocarbon polymer, thereby producing a product containing a fraction which comprises hydrovisbroken polymer.

2. A method as recited in claim 1 wherein the solvent comprises a combined weight percentage of said hydrocarbons of at least about 20 weight percent.

3. A method as recited in claim 2 wherein a product fraction from a hydrotreater is employed as the solvent and comprises a combined weight percentage of said hydrocarbons of about 20-30 weight percent.

4. A method as recited in claim 1 wherein said at least one hydrocarbon polymer comprises at least one polyolefin.

5. A method as recited in claim 4 wherein said at least one polyolefin is selected from the group consisting of polyethylene, polypropylene and mixtures thereof.

6. A method as recited in claim 1 wherein the weight ratio of the solvent to hydrocarbon polymer is about 1-4 to 1.

7. A method as recited in claim 1 wherein said conditions in step (b) include a temperature of about 800° F.-1000° F. and a pressure of about 900-1500 psig.

8. A method as recited in claim 1 further comprising reducing scrap articles, comprising said at least one hydrocarbon polymer, in size to smaller pieces before step (a), and employing the thus reduced articles in the mixture of steps (a) and (b).

* * * * *